United States Patent Office 2,893,888
Patented July 7, 1959

2,893,888

METHOD OF PROTECTING REFRACTORY LINING OF A HIGH TEMPERATURE FURNACE

Michael F. Yarotsky, Chicago, Ill., assignor to United States Steel Corporation, a corporation of New Jersey No Drawing. Application July 8, 1955
Serial No. 520,909

3 Claims. (Cl. 117—6)

This invention relates to a method of protecting the refractory lining of a high temperature furnace and more particularly for protecting the refractory lining of an open hearth furnace during periods of shutdowns. When the furnace is in production the molten steel of the charge attacks the refractory in contact therewith and causes the surface thereof to be irregular and porous. When the furnace is shut down for any relatively long period of time, normal atmospheric conditions are such that moisture and other materials in the atmosphere cause erosion and crumbling of the refractory.

It is therefore an object of my invention to provide a method of protecting the refractory lining of a furnace from damage due to atmospheric conditions during periods of shutdowns.

This and other objects will be more apparent after referring to the following specification.

After the furnace has cooled down a relatively thin coating of plastic material is sprayed over the refractory lining. In the preferred form of my invention the mixture used in this first coating comprises 14 to 18% of a plastic material which is preferably vinyl chloride acetate co-polymer composed of 89 to 93% chloride and 11 to 7% acetate, 7 to 9% tri-cresyl phosphate which functions as a plasticizer and 79 to 73% of methyl ethyl ketone which functions as a solvent. The non-volatile content of this mixture is between 21 and 27% and its viscosity is between 200 and 400 (centipoises @ 77° F.). This coating levels off the irregularities which are present in the refractory lining and presents a cobwebby effect. After the coating has set a second thicker coating of approximately .01 inch is sprayed thereover. The second coating is preferably made of a mixture of 16 to 20% vinyl chloride acetate co-polymer composed of 85 to 89% chloride and 15 to 11% acetate, 4 to 7% tri-cresyl phosphate, 1 to 3% of a pigment which is preferably titanium dioxide, 14 to 16% nitro propane and 66 to 57% toluol. All percentages are by weight. These last two compounds function as a solvent. The non-volatile content of this second mixture is between 21 and 30% and its viscosity is the same as that of the first mixture. This coating provides a surface which is impervious to normal atmospheric conditions and prevents passage of moisture which causes erosion of the furnace lining. When it is desired to again start the furnace in operation the coating can be readily peeled from the furnace although this is optional since the coatings are non-flashing and the furnace charge can be placed on top thereof.

While one embodiment of my invention has been shown and described it will be apparent that other adaptations and modifications may be made without departing from the scope of the following claims.

I claim:

1. The method of protecting an inner surface of the previously heated refractory lining of a high temperature furnace from damage due to atmospheric conditions during shutdowns which comprises spraying a mixture of a plastic material, plasticizer and solvent over said refractory lining to provide a first coating, permitting the coating to set, and then spraying a mixture of a plastic material, plasticizer, solvent and pigment over said first coating, said mixtures being limited to materials safe for the refractory.

2. The method of protecting an inner surface of the previously heated refractory lining of a high temperature furnace from damage due to atmospheric conditions during shutdowns which comprises spraying a mixture of vinyl chloride-vinyl acetate co-polymer, tri-cresyl phosphate and methyl ethyl ketone over said refractory lining to provide a first coating, permitting the coating to set, and then spraying a mixture of vinyl chloride-vinyl acetate co-polymer, tri-cresyl phosphate, methyl ethyl ketone and titanium dioxide over said first coating, said coatings being limited to materials safe for the refractory.

3. The method of protecting an inner surface of the previously heated refractory lining of a high temperature furnace from damage due to atmospheric conditions during shutdowns according to claim 2 in which the first mixture comprises from 14 to 18% vinyl chloride-vinyl acetate co-polymer, 7 to 9% tri-cresyl phosphate and 79 to 73% methyl ethyl ketone, and the second mixture comprises from 16 to 20% vinyl chloride-vinyl acetate co-polymer, 4 to 7% tri-cresyl phosphate 1 to 3% titanium dioxide, 14 to 16% nitro propane and 66 to 57% toluol.

References Cited in the file of this patent

UNITED STATES PATENTS

| | | |
|---|---|---|
| 2,215,340 | Vasen | Sept. 17, 1940 |
| 2,441,227 | Pineles | May 11, 1948 |
| 2,549,050 | Brophy et al. | Apr. 17, 1951 |
| 2,615,820 | Schwoegler | Oct. 28, 1952 |
| 2,603,574 | Holmes | July 15, 1952 |

FOREIGN PATENTS

| | | |
|---|---|---|
| 549,009 | Great Britain | Nov. 3, 1942 |
| 293,116 | Switzerland | Sept. 15, 1953 |
| 478,822 | Italy | Mar. 5, 1953 |

OTHER REFERENCES

Corrosion Handbook (Uhlig), John Wiley and Sons, Inc. (1948), pp. 878–884 relied on.

Camp et al.: The Making, Shaping and Treating of Steel, sixth edition, 1951, page 335.